United States Patent
Roozeboom

(10) Patent No.: US 11,821,504 B2
(45) Date of Patent: Nov. 21, 2023

(54) SPLIT SPROCKETS FOR USE IN CONVEYOR SYSTEMS

(71) Applicant: Precision, Inc., Pella, IA (US)

(72) Inventor: Matthew Roozeboom, Pella, IA (US)

(73) Assignee: Precision, Inc., Pella, IA (US)

(*) Notice: Subject to any disclaimer, the term of this patent is extended or adjusted under 35 U.S.C. 154(b) by 32 days.

(21) Appl. No.: 17/582,846

(22) Filed: Jan. 24, 2022

(65) Prior Publication Data
US 2022/0252143 A1    Aug. 11, 2022

Related U.S. Application Data

(60) Provisional application No. 63/146,351, filed on Feb. 5, 2021.

(51) Int. Cl.
| | | |
|---|---|---|
| *F16H 55/12* | (2006.01) | |
| *F16D 1/08* | (2006.01) | |
| *F16H 55/30* | (2006.01) | |

(52) U.S. Cl.
CPC ............ *F16H 55/12* (2013.01); *F16D 1/0864* (2013.01); *F16H 55/30* (2013.01)

(58) Field of Classification Search
CPC ......... F16H 55/12; F16H 55/30; F16D 1/0864
USPC ........................................................ 474/95
See application file for complete search history.

(56) References Cited

U.S. PATENT DOCUMENTS

| | | | | |
|---|---|---|---|---|
| 5,057,058 A | * | 10/1991 | Crudup | ............ F16H 55/46 474/95 |
| 5,295,917 A | * | 3/1994 | Hannum | ............ F16H 55/46 474/95 |
| 5,316,522 A | | 5/1994 | Carbone et al. | |
| 5,322,478 A | * | 6/1994 | Bos | ............ B65G 23/06 474/96 |
| 5,702,326 A | * | 12/1997 | Renteria | ............ A61H 3/04 482/68 |
| 6,074,316 A | | 6/2000 | Murrietta | |
| 6,086,495 A | * | 7/2000 | Stebnicki | ............ F16H 55/46 474/96 |
| 6,146,299 A | * | 11/2000 | Harvey | ............ F16H 55/46 474/95 |
| 11,130,638 B2 | * | 9/2021 | Westergaard Andersen | ............ B65G 39/02 |

FOREIGN PATENT DOCUMENTS

KR    20120140319 A    12/2012

OTHER PUBLICATIONS

Rexnord NS7956 Thermoplastic Split Sprocket, https://www.arrowconveyor.com/wp-content/uploads/2021/01/rexnord-7956, 1 page, available before Feb. 5, 2021.
Intralox Series 800, Abrasion Resistant Split Metal Sprockets, p. 94, available before Feb. 5, 2021.

* cited by examiner

*Primary Examiner* — Gene O Crawford
*Assistant Examiner* — Emily R Kincaid
(74) *Attorney, Agent, or Firm* — Armstrong Teasdale LLP

(57) ABSTRACT

A split sprocket for use in a modular conveyor belt is disclosed. The split sprocket includes first and second portions that may be selectively arranged in a first configuration in which the sprocket maintains a fixed axial position on the shaft and a second configuration in which the sprocket can axially float along the shaft.

19 Claims, 17 Drawing Sheets

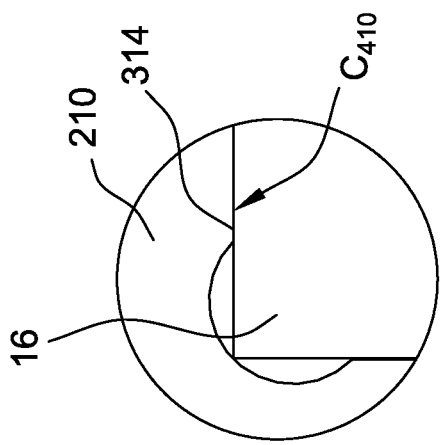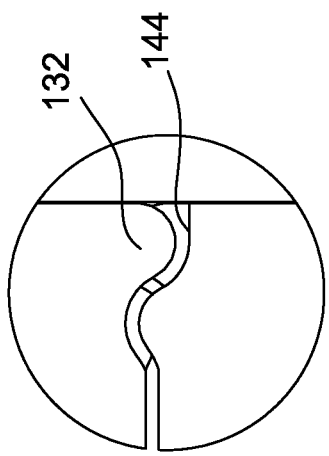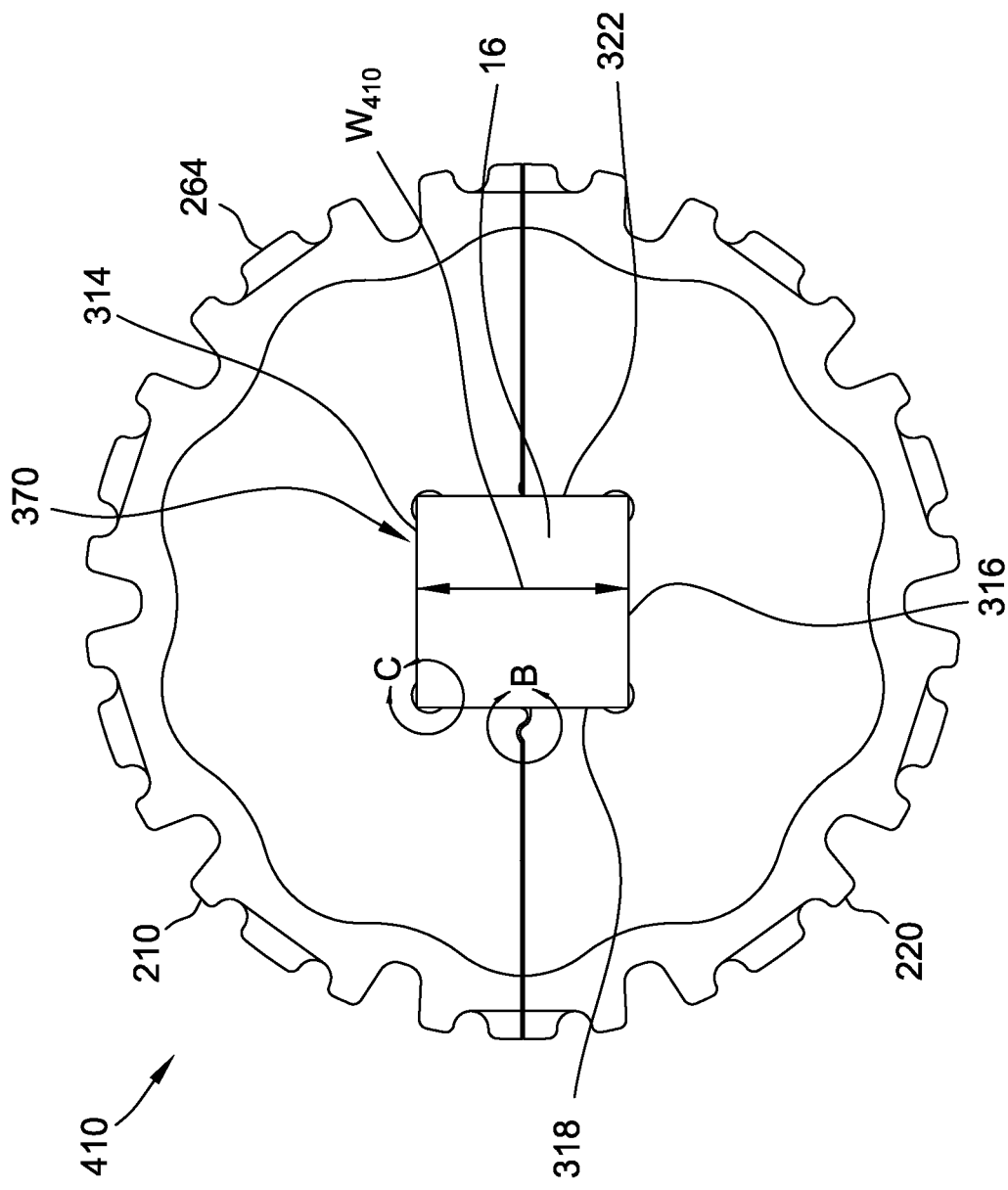
FIG. 12B
FIG. 12C
FIG. 12A

SPLIT SPROCKETS FOR USE IN CONVEYOR SYSTEMS

CROSS-REFERENCE TO RELATED APPLICATION

This application claims the benefit of U.S. Provisional Patent Application No. 63/146,351, filed Feb. 5, 2021, which is incorporated herein by reference in its entirety.

FIELD OF THE DISCLOSURE

The field of the disclosure relates generally to sprockets for use in a conveyor systems and, more particularly, to split sprockets for use in a modular conveyor belt system in an industrial food processing system.

BACKGROUND

A modular conveyor belt system is typically driven by a rotating shaft with a plurality of sprockets positioned along the length of the shaft. As the shaft rotates, the teeth along the circumferential surface of each sprocket mate with the underside of the belt modules to propel an article along the belt's length. At least one sprocket is secured to the shaft with shaft collars to maintain the belt's alignment. Other sprockets are allowed to float along the length of the shaft to adapt to thermal expansion of the belt as needed.

In many such applications, each sprocket is configured as a single piece with a bore through its center, such that the sprocket can only be installed or removed by removing the entire shaft to slide the sprocket on or off an end of the shaft. Other sprockets are configured as two semicircular halves that are held together with a clamp, bolts, or other hardware. Such embodiments, known as split sprockets, can be added or removed from the conveyor belt system without removing the shaft from the assembly.

Conveyors used in food processing applications are typically designed to allow the conveyer components to be sanitized. To avoid cross-contamination or other sanitation issues, conveyor systems and components are often designed without any holes or crevasses that can harbor bacteria. Alternatively, parts may be designed for easy disassembly such that all surfaces, including those with no direct contact with food products, are accessible for thorough cleaning.

In many "wet" food industries, such as meat and dairy, equipment may be disassembled for cleaning as often as every shift. Extensive disassembly procedures can make the shift change process cumbersome and inefficient.

There is a need for a split sprocket that can be quickly and easily removed from a conveyor for cleaning and/or that may be arranged in a first configuration in which the sprocket is axially fixed in position relative to the shaft and a second configuration in which the sprocket may float along the shaft.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a split sprocket having a rotational axis. The split sprocket includes first and second sprocket portions. The first sprocket portion has first and second sides. A mid-plane is parallel to the first and second sides and extends through the first sprocket portion. The first sprocket portion includes a first circumferential outer surface for engaging a belt. The first circumferential outer surface has first and second ends and a center line midway between the first and second ends. The center line is parallel to the rotational axis. The first sprocket portion includes a center plane perpendicular to the mid-plane. The rotational axis and center line are contained in the center plane. The first sprocket portion includes a first mating face. The first mating face has a first protrusion and a first recess. The first recess is disposed (1) across the mid-plane and opposite from the first protrusion or (2) across the center plane and opposite the first protrusion. The second sprocket portion has first and second sides. A mid-plane is parallel to the first and second sides and extends through the second sprocket portion. The second sprocket portion includes a second circumferential outer surface for engaging a belt. The second circumferential outer surface has first and second ends and a center line midway between the first and second ends. The center line is parallel to the rotational axis. The second sprocket portion includes a center plane perpendicular to the mid-plane. The rotational axis and center line are contained in the center plane. The second sprocket portion includes a second mating face. The second mating face has a second protrusion and a second recess. The second recess is disposed (1) across the mid-plane and opposite from the second protrusion or (2) across the center plane and opposite the second protrusion.

Another aspect of the present disclosure is directed to a split sprocket for engaging a belt. The split sprocket includes first and second sprocket portions. The first sprocket portion has a first circumferential outer surface. The first circumferential outer surface includes first and second ends. The first sprocket portion has a first mating face that extends between the first and second ends of the first circumferential outer surface. The first sprocket portion includes a first notch for receiving a shaft. The second sprocket portion includes a second circumferential outer surface. The second circumferential outer surface includes first and second ends. The second sprocket portion has a second mating face that extends between the first and second ends of the second circumferential outer surface. The second sprocket portion includes a second notch for receiving the shaft. The split sprocket may be assembled in (1) a first configuration in which the first and second notches form a first sprocket opening for receiving the shaft and (2) a second configuration in which the first and second notches form a second sprocket opening for receiving the shaft. A width of the second sprocket opening exceeds a width of the first sprocket opening.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 12A is a side view of the split sprocket in the first configuration;

FIG. 12B is a detailed side view of the split sprocket in the first configuration;

FIG. 12C is another detailed side view of the split sprocket in the first configuration;

Corresponding reference characters indicate corresponding parts throughout the drawings.

DETAILED DESCRIPTION

Figure 1:
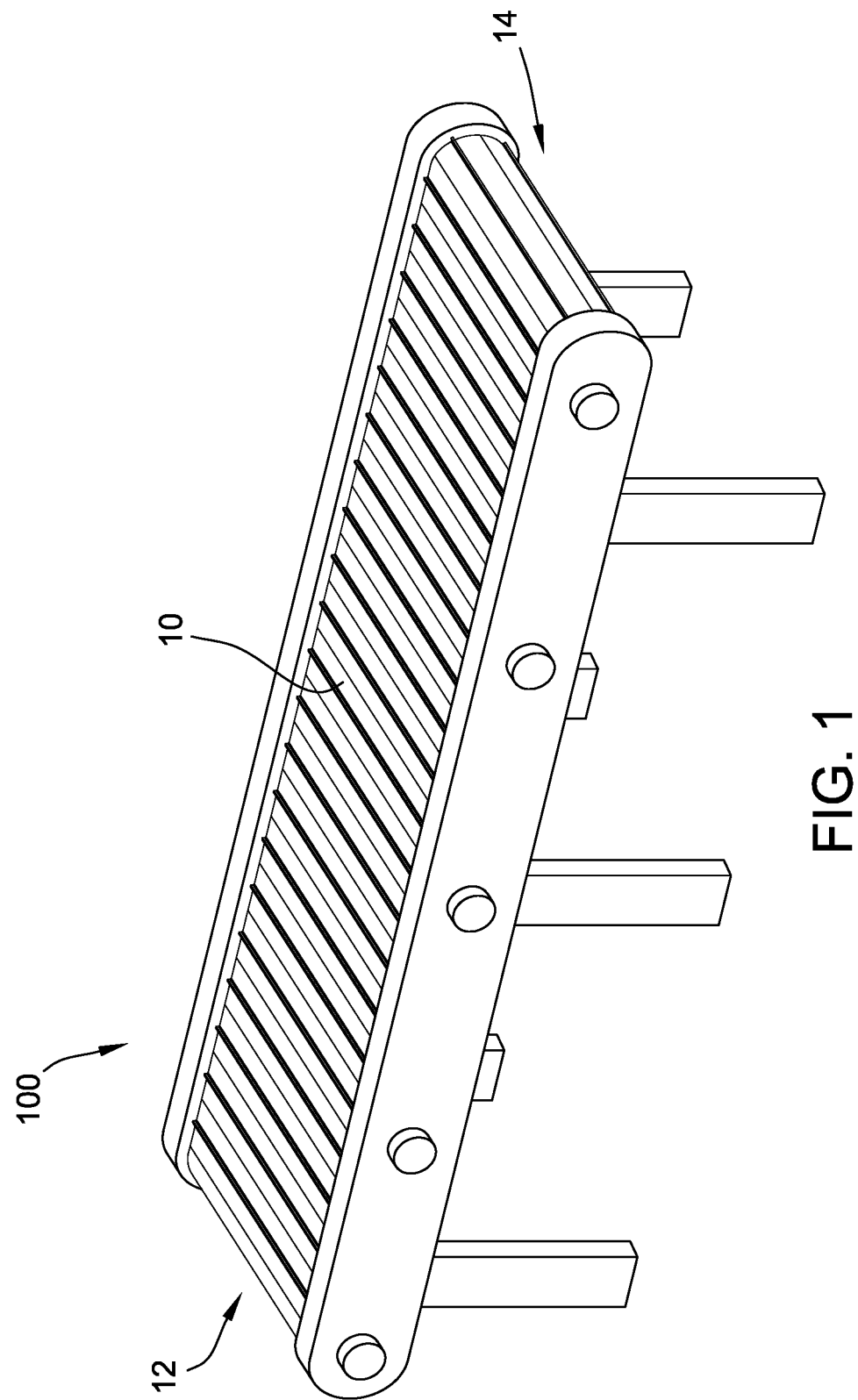
FIG. 1 is a side view of a conveyor system.
Figure 2:
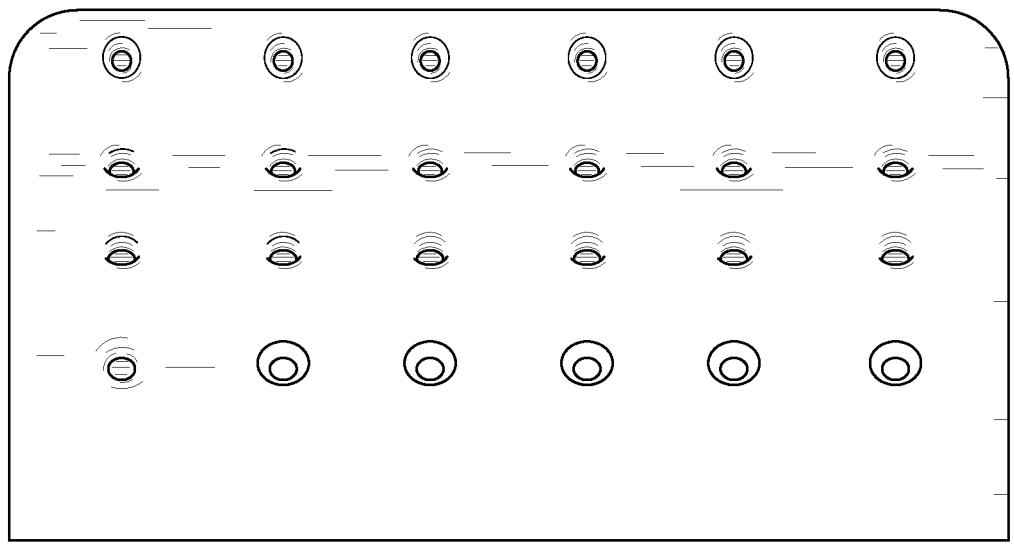
FIG. 2 is a front cross-section view of the conveyor system.

A conveyor system 100 comprising a conveyor belt 10 that rotates about a drive assembly 12 and tail assembly 14 is shown in FIG. 1. The conveyor belt 10 may be "modular" having sections that are connected together by pins. In other embodiments, the belt is not modular (i.e., is a continuous belt). The conveyor system 100 includes one or more sprocket assemblies 200 (FIG. 2). The sprocket assembly 200 may be used as at least one of the drive assembly 12 and the tail assembly 14. In some embodiments, both the drive assembly 12 and tail assembly 14 includes a sprocket assembly 200. Alternatively or in addition, one or more sprocket assemblies 200 may be disposed between the drive assembly 12 and the tail assembly 14. In other embodiments, no sprocket assemblies 200 are disposed between the drive assembly 12 and tail assembly 14 (e.g., the conveyor system 100 includes slider pans or one or more rails and not sprockets between the drive assembly 12 and tail assembly 14).

Each sprocket assembly 200 includes a shaft 16 with at least one split sprocket 20 positioned along its length. The shaft 16 extends through the split sprocket 20. The shaft 16 may be made of stainless steel or other similar material. In some embodiments, the shaft 16 has a square cross-section, but its cross-section may also be a circle, a polygon with an even number of sides, or any shape that allows the conveyor system to function as described herein.

Generally, any number of split sprockets 20 may be positioned along the length of the shaft 16 (e.g., 2, 3, 4, 6, 8, 10 or more). The distance between sprockets 20 may be determined based on the load carried by the belt 10. Each split sprocket 20 may be either secured to the shaft in a fixed axial position or is capable of sliding along its length. In an exemplary embodiment, at least one split sprocket 20 is in a fixed position, and all other split sprockets 20 are allowed to "float" along the length of the shaft 16. Generally any number of split sprockets 20 may be in the fixed position (one, two, three or more). The sprockets 20 may be made of plastic, metal (e.g., stainless steel) or any other material that allows the conveyor system 100 to function as described herein. In some embodiments of the present disclosure the split sprockets are made of stainless steel.

Figure 3:
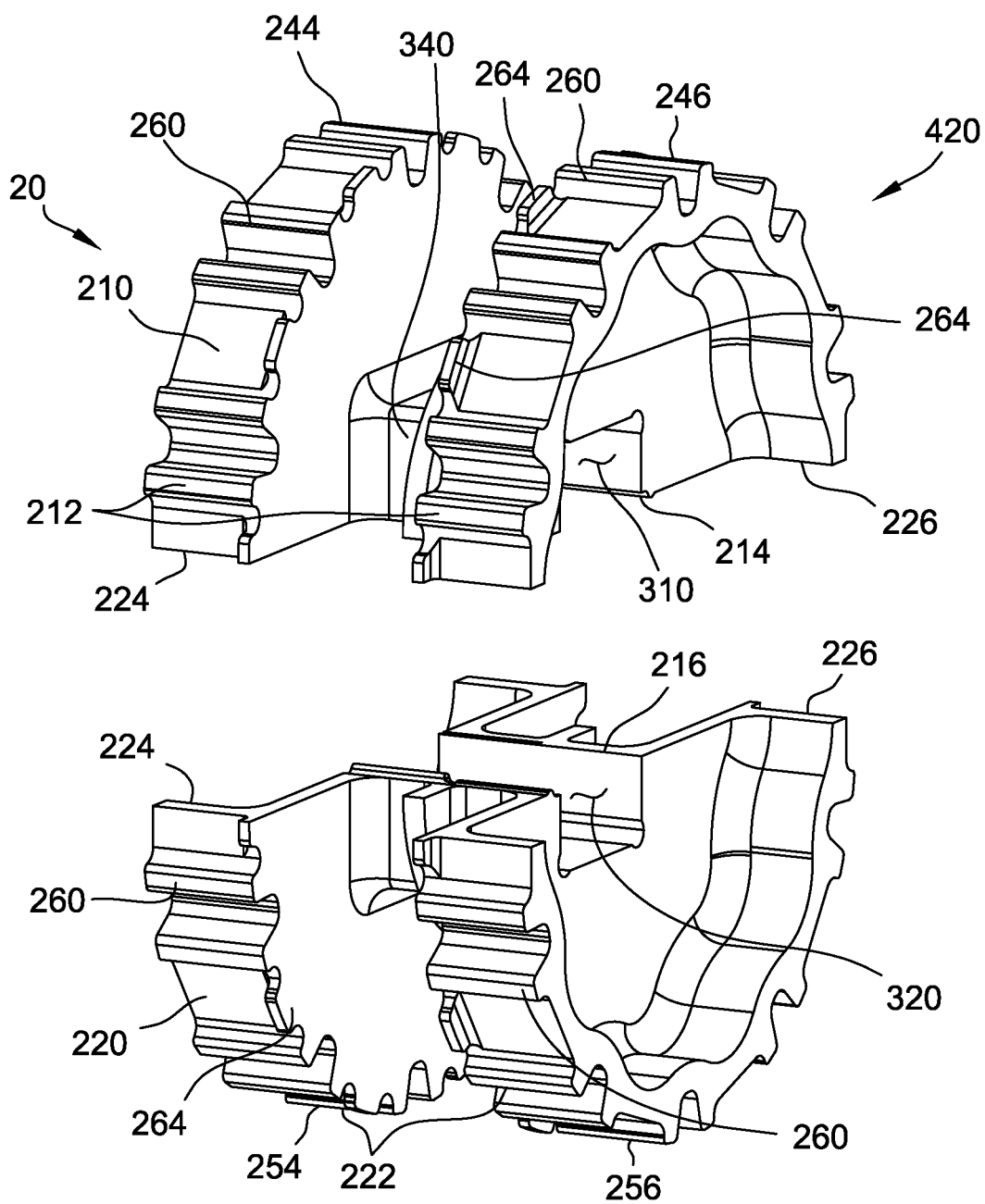
FIG. 3 is an exploded perspective view of a split sprocket of the conveyor system.
Figure 4:
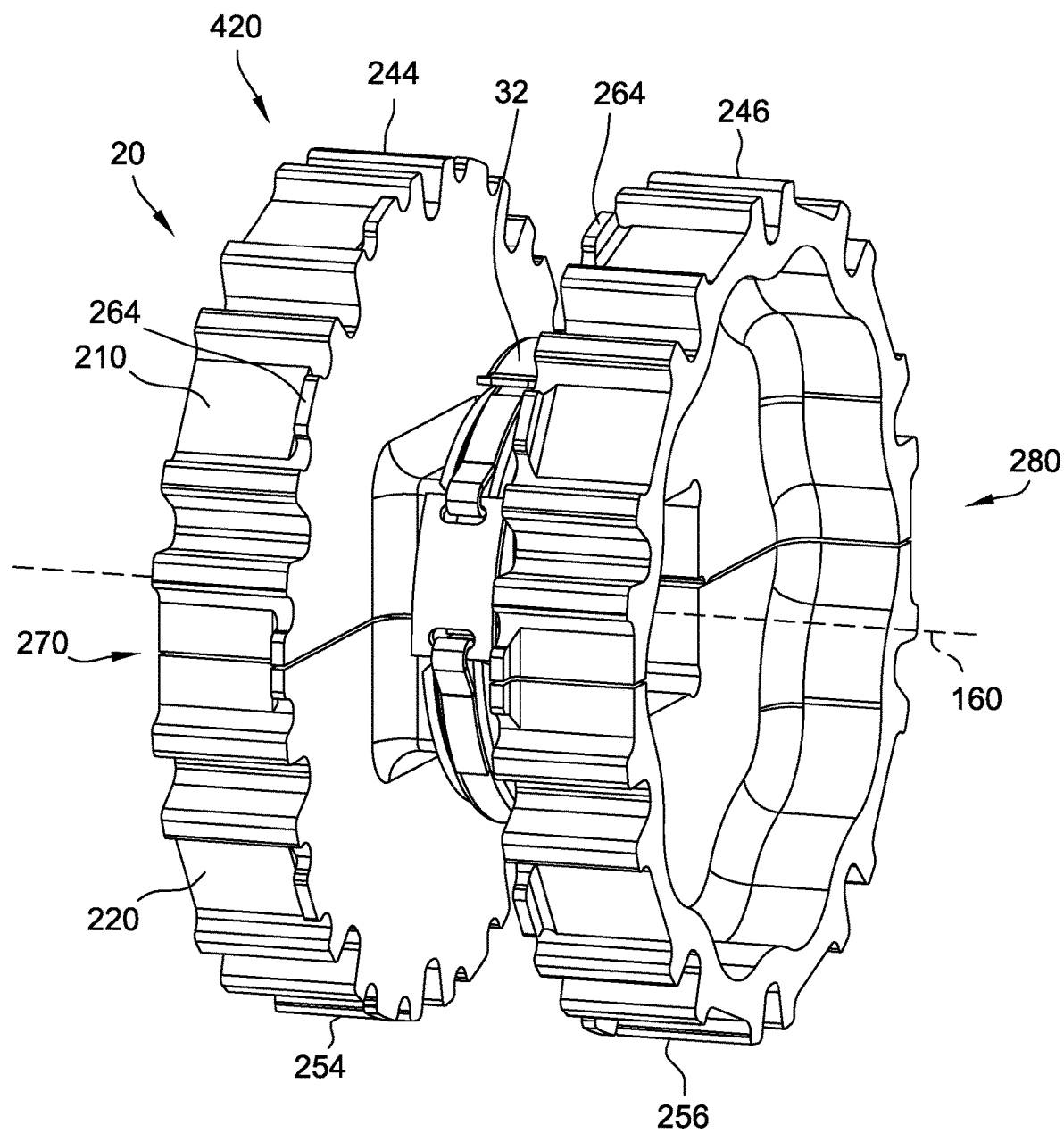
FIG. 4 is a perspective view of the split sprocket.
Figure 6:
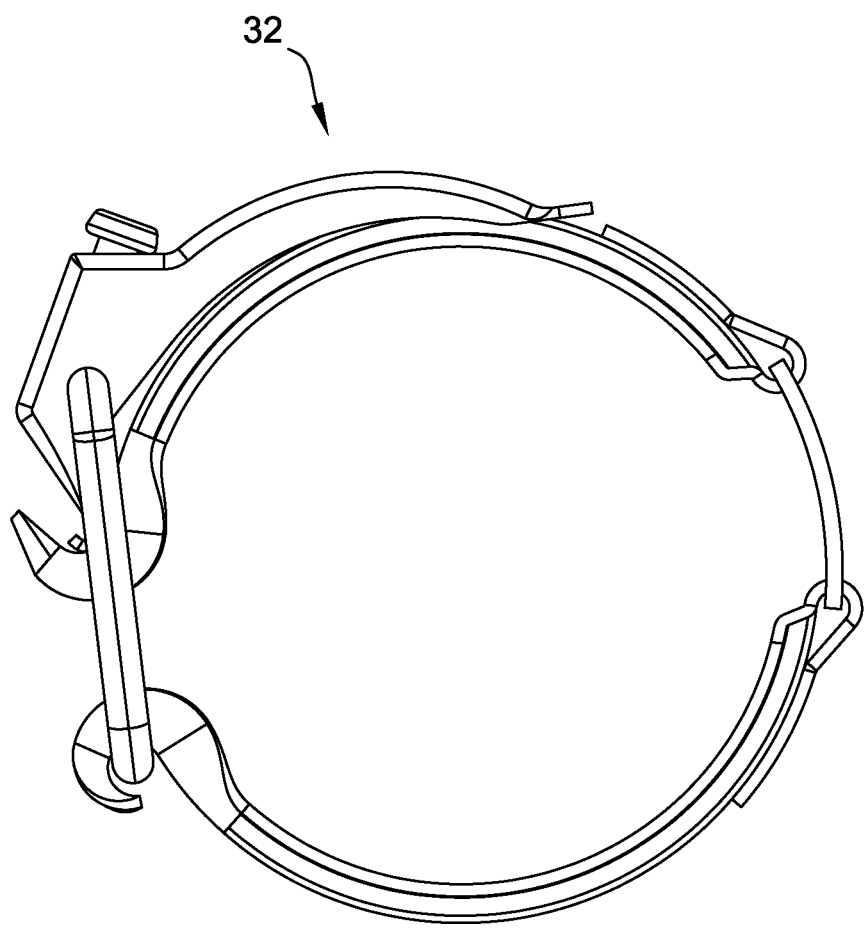
FIG. 6 is a side view of a clamp of the split sprocket.
Figure 17:
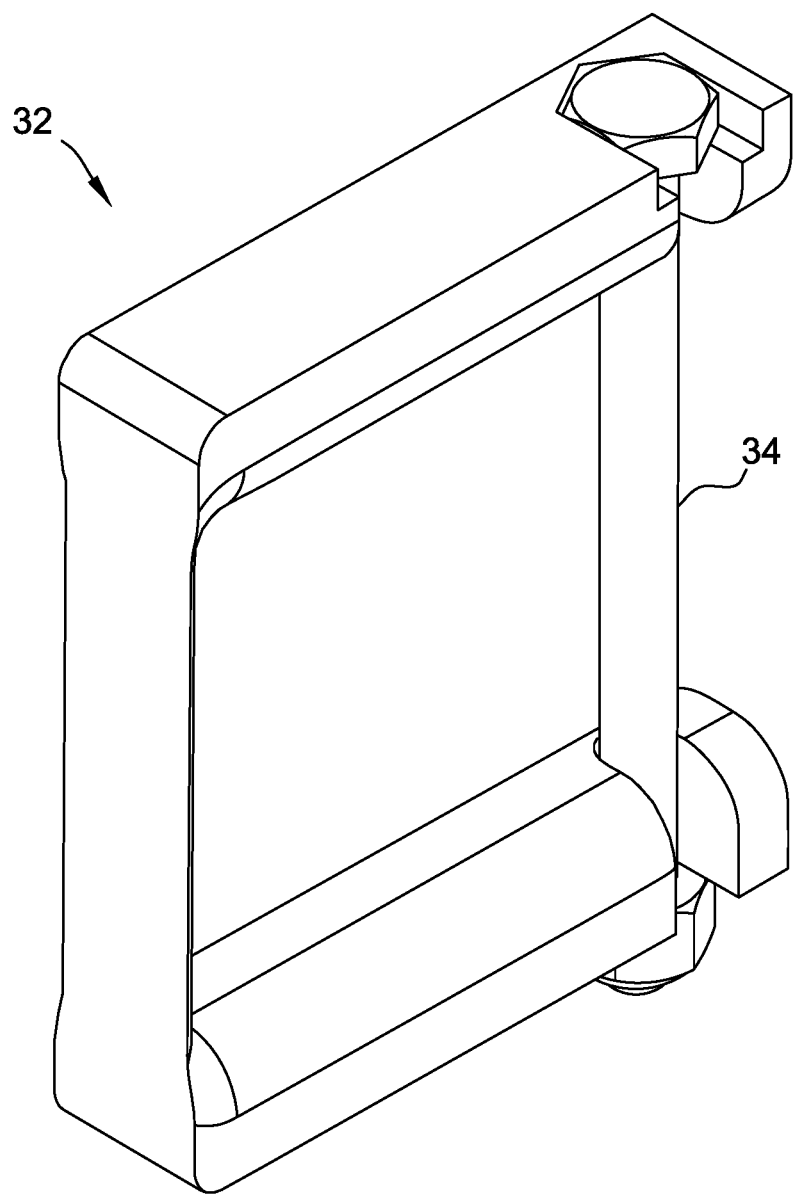
FIG. 17 is a perspective view of another embodiment of a clamp of the split sprocket.

Referring now to FIG. 3, each split sprocket 20 comprises a first sprocket portion 210, a second sprocket portion 220, and a clamp 32 (FIG. 4) that secures the two sprocket portions 210, 220 together. In some embodiments, the clamp 32 is a toolless clamp, but the split sprocket 20 may also be configured with a clamp that is fastened by tools. Referring now to FIG. 6, the clamp 32 is a sanitary clamp and, in particular, a toggle sanitary clamp. Another embodiment of the clamp 32 is shown in FIG. 17. The clamp 32 illustrated in FIG. 17 is a square clamp that it tightened by a fastener 34 (i.e., the clamp is flexible which enables it to be tightened). In other embodiments, different clamp designs (including embodiments having more than one clamp) may be used such as a hose clamp, split shaft collar, hinged shaft collar or standard sanitary clamp may be used. When assembled (i.e., clamped), the first and second sprocket portions 210, 220 form a split sprocket 20 configured to engage with the conveyor belt 10. The split sprocket 20 rotates about a rotational axis 160 (FIG. 4)

In the illustrated embodiment, the first and second sprocket portions 210, 220 are identical. In other embodiments, the first and second sprocket portions 210, 220 have one or more different features. The single sprocket portion shown in FIG. 7 may be either of the first and second sprocket portions 210, 220. Each sprocket portion 210, 220 has a first side 234 and a second side 236. A mid-plane 180 (FIG. 9) parallel to the first and second sides 234, 236 extends through the sprocket portion 210, 220.

The first sprocket portion 210 (FIG. 3) includes a first sprocket wheel segment 244 and a second sprocket wheel segment 246. Each wheel segment 244, 246 has teeth 260 for engaging the belt 10 (FIG. 1). The first sprocket wheel segment 244 is across the mid-plane 180 (FIG. 9) from the second sprocket wheel segment 246. A first hub segment 340 connects the sprocket wheel segments 244, 246.

Figure 5:
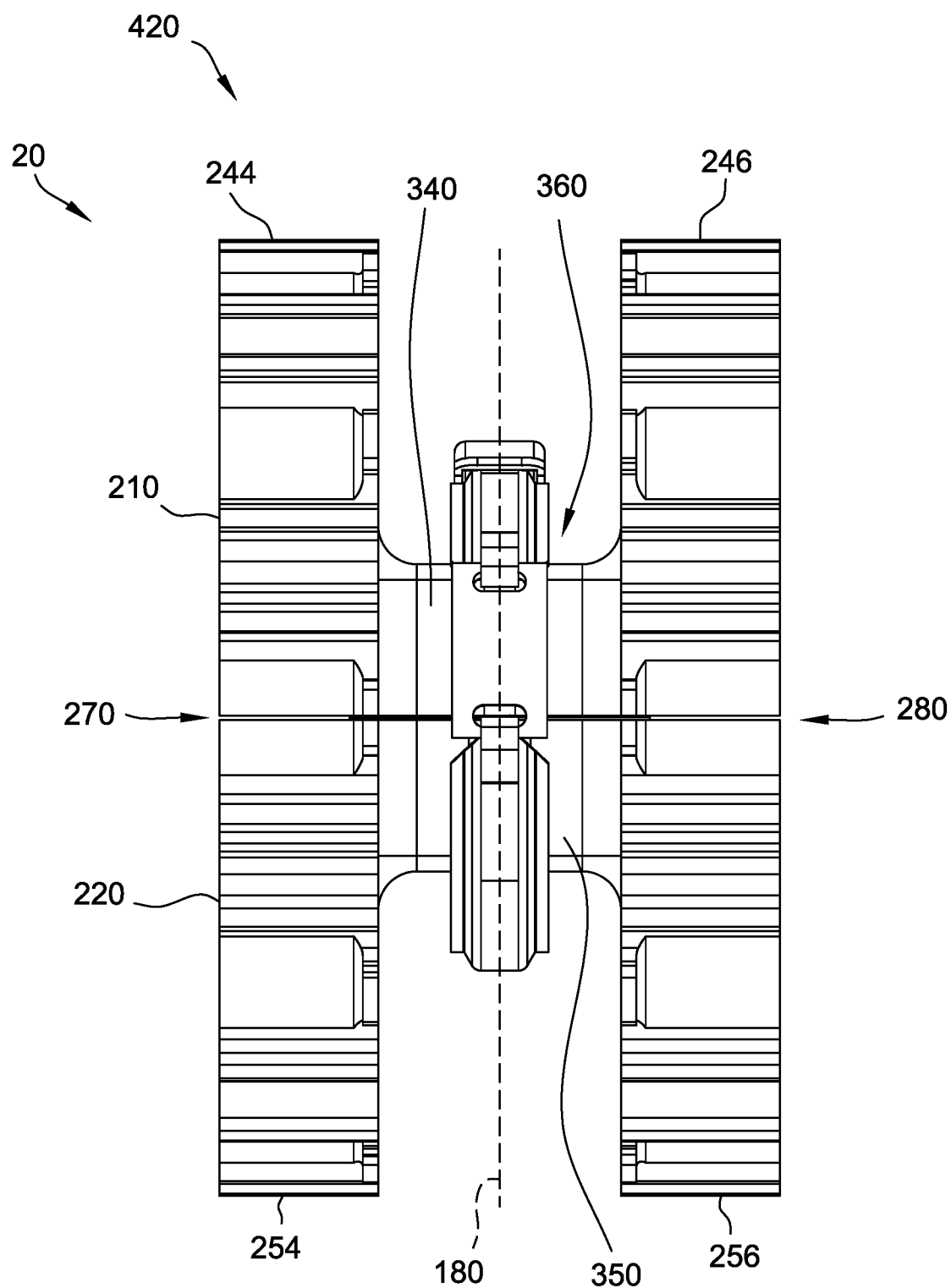
FIG. 5 is an front view of the split sprocket.

Similarly, the second sprocket portion 220 includes a third sprocket wheel segment 254 and a fourth sprocket wheel segment 256 with both segments 254, 256 having teeth 260 for engaging the belt 10 (FIG. 1). The third sprocket wheel segment 254 is across the mid-plane 180 (FIG. 9) from the fourth sprocket wheel segment 256. A second hub segment 350 (FIG. 5) connects the sprocket wheel segments 254, 256. As described further below, each first and second sprocket wheel segments 244, 246 mates with either the third or fourth sprocket wheel segment 254, 256 to form a first sprocket wheel 270 (FIG. 5) and a second sprocket wheel 280.

The first sprocket portion 210 has a first sprocket portion notch 310 and the second sprocket portion 220 has a second sprocket portion notch 320. As described further below, when the split sprocket 20 is assembled, the notches 310, 320 together form a sprocket opening for receiving the shaft 16 (FIG. 2).

Figure 8:
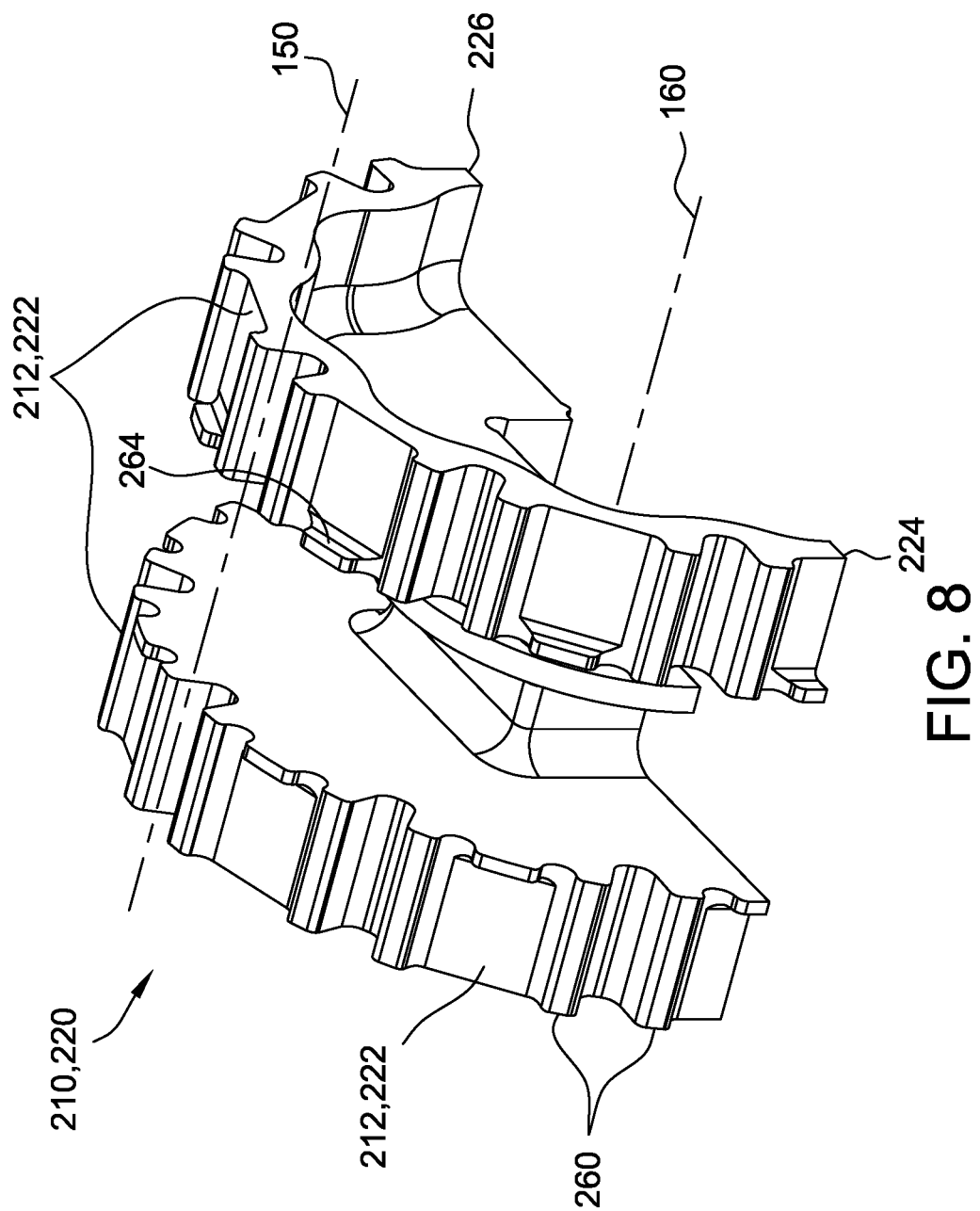
FIG. 8 is another perspective view of the split sprocket portion.

The first sprocket portion 210 includes a first circumferential outer surface 212 and the second sprocket portion 220 includes a second circumferential outer surface 222 for engaging the belt 10 (FIG. 1). The circumferential outer surfaces 212, 222 include teeth 260 for engaging the belt 10. In the illustrated embodiment, the circumferential outer surface also includes tabs 264 perpendicular to the teeth 260 to maintain alignment of the belt 10. Each circumferential outer surface 212, 222 includes a first end 224, a second end 226, and a center line 150 (FIG. 8) midway between the first and second ends 224, 226 along the circumferential outer surface 212, 222. The center line 150 is parallel to the rotational axis 160, and both the center line 150 and the rotational axis 160 are contained in a center plane 190 (FIG. 9) perpendicular to the mid-plane 180.

Figure 7:
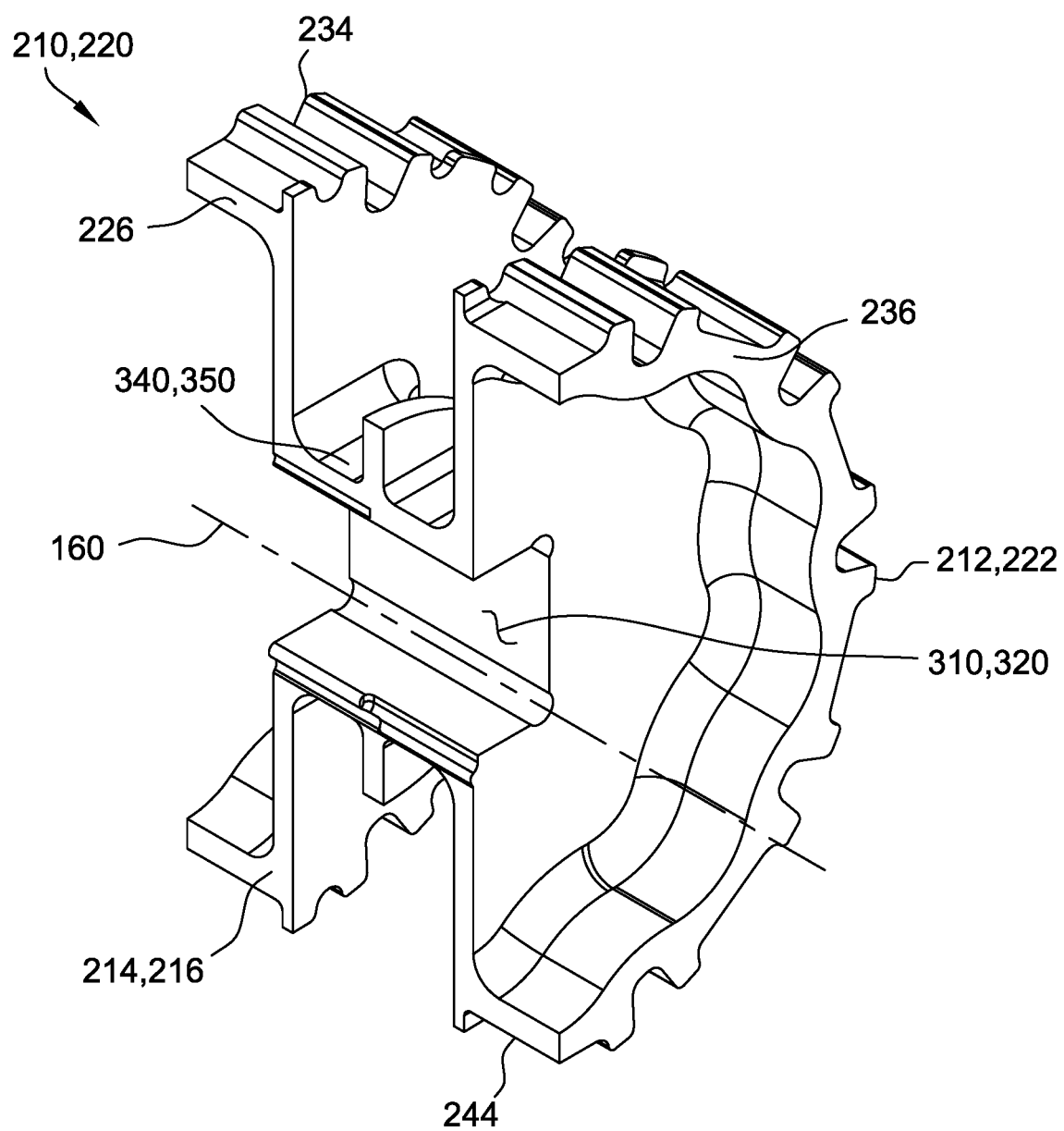
FIG. 7 is a perspective view of a split sprocket portion of the split sprocket.

The first sprocket portion 210 includes a first mating face 214 that extends between the first and second ends 224, 226 of the first circumferential outer surface 212 (i.e., the first mating face 214 defines a chord that extends between the first and second ends 224, 226 of the first circumferential outer surface 212). Similarly, the second sprocket portion 220 includes a second mating face 216 that extends between the first and second ends 224, 226 of the second circumferential outer surface 222 (i.e., the second mating face 216 defines a chord that extends between the first and second ends 224, 226 of the second circumferential outer surface 222). A neutral plane 170 (FIG. 9) is parallel to the mating face 214, 216 and may be coincident with a major surface 225 (FIG. 10) of the mating face 214, 216. With reference to FIG. 7, in the illustrated embodiment, each mating face 214, 216 does not extend continually between the first and second ends 224, 226 of the circumferential outer surface 212, 222. Each mating face 214, 216 is divided into two portions separated by the respective notch 310, 320 in which the shaft 16 (FIG. 2) is received.

Figure 9:
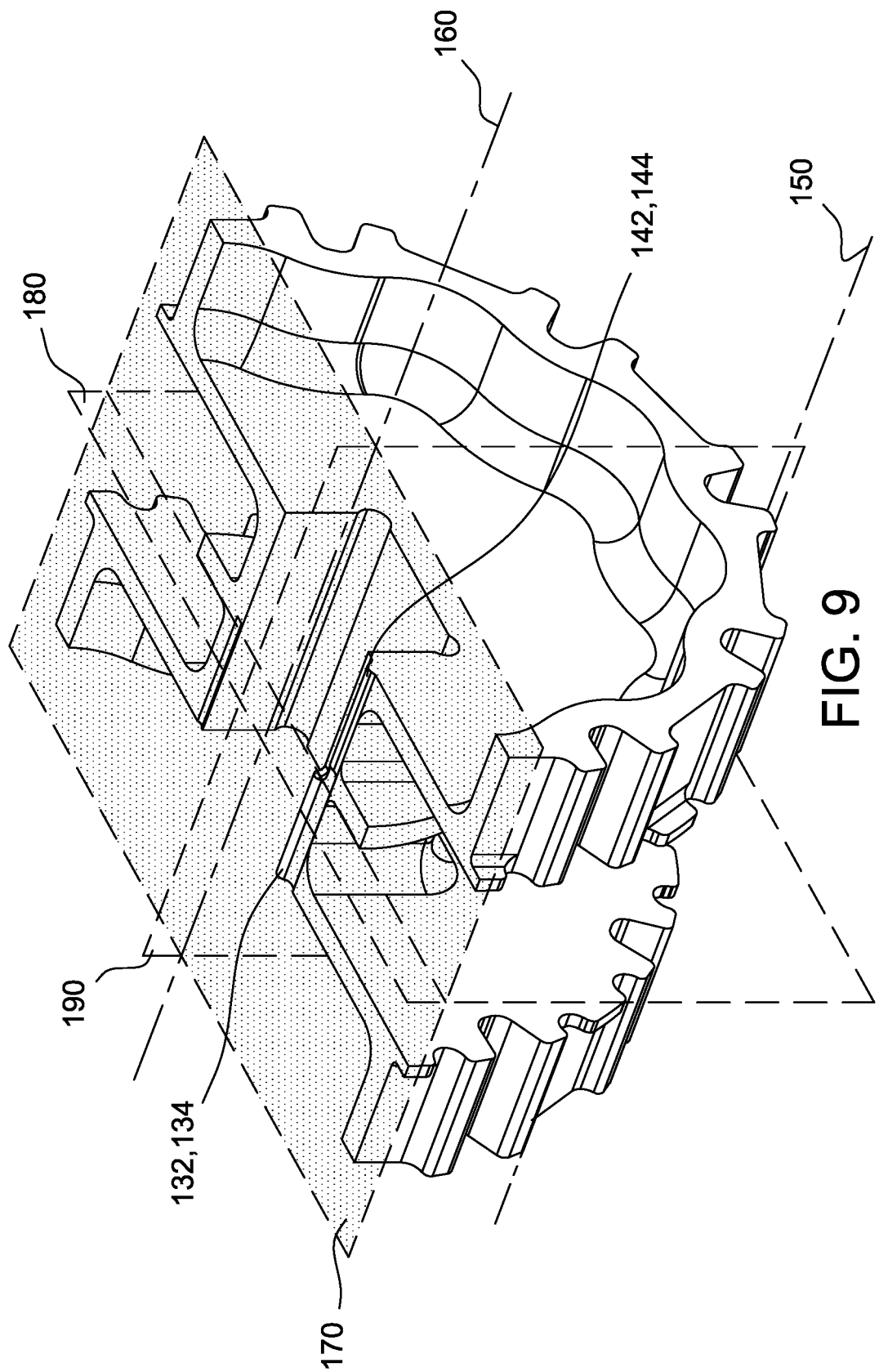
FIG. 9 is yet another perspective view of a split sprocket portion showing related planes and lines.
Figure 10:
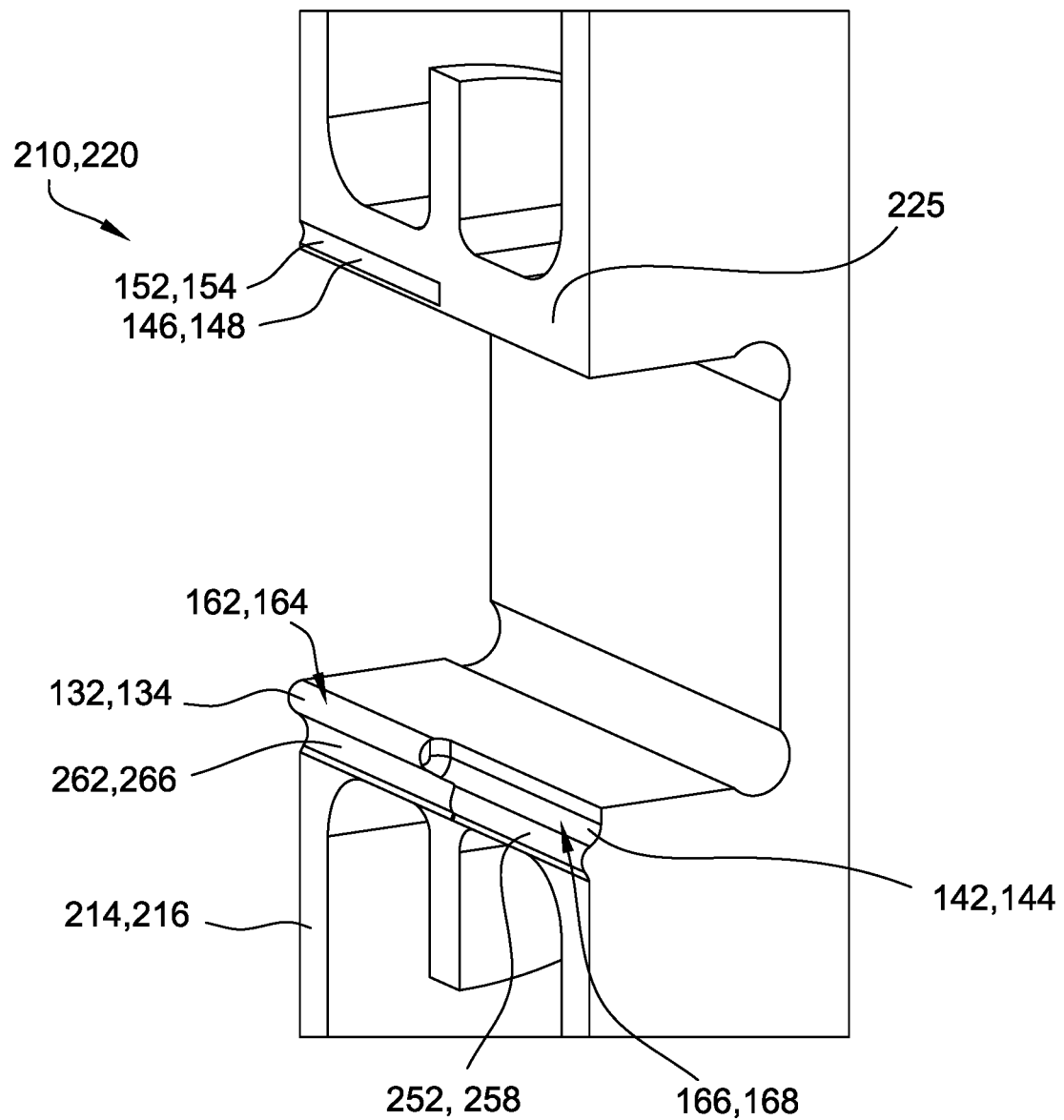
FIG. 10 is a detailed view of the mating face of the split sprocket portion.
Figure 11:
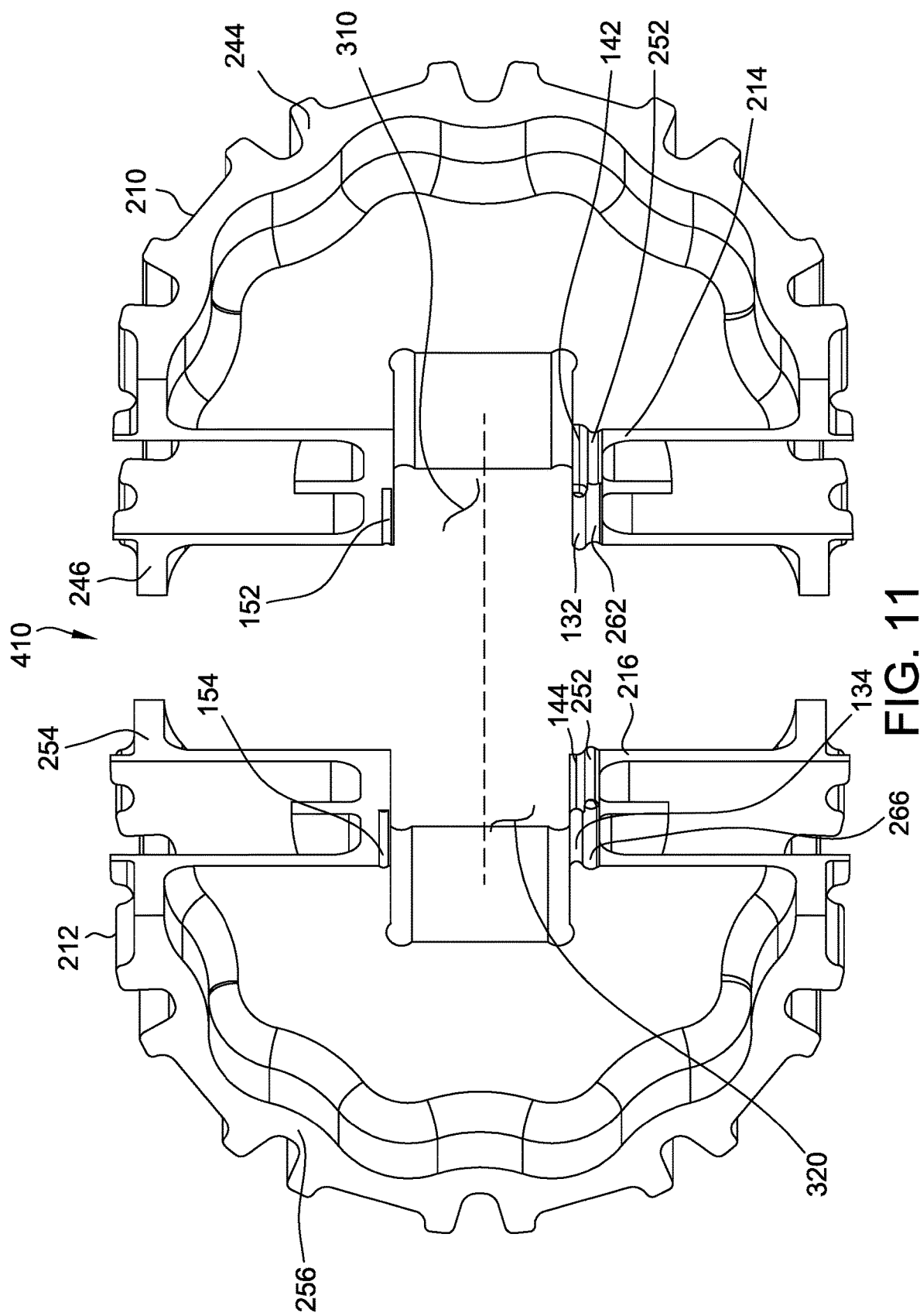
FIG. 11 is an exploded view of the split sprocket in a first configuration showing the mating alignment of the split sprocket portions.
Figure 13:
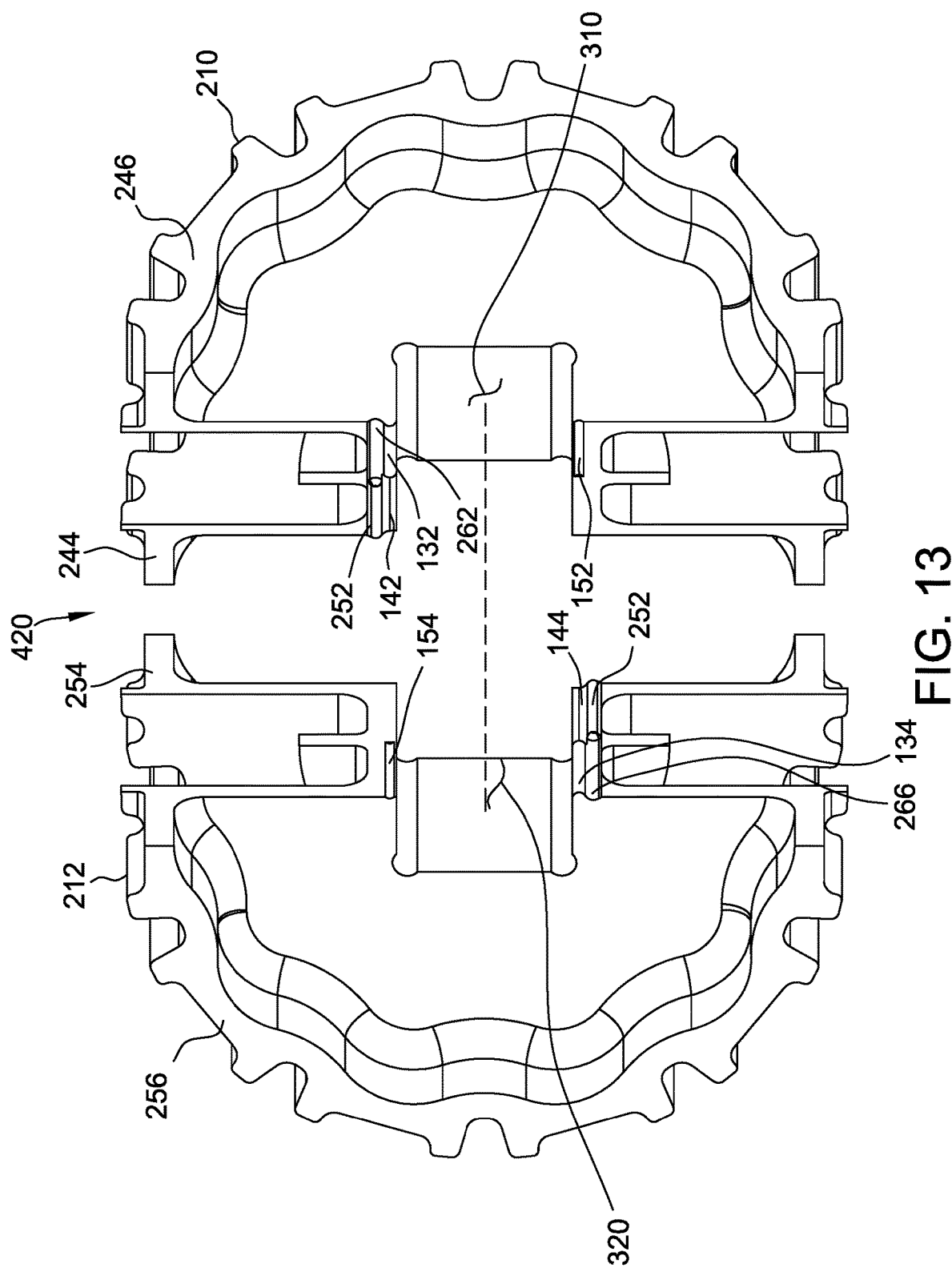
FIG. 13 is an exploded view of the split sprocket in a second configuration showing the mating alignment of the split sprocket portions.

The first and second mating faces 214, 216 are shown in greater detail in FIG. 10 (with one portion 210, 220 being shown because the portions 210, 220 are identical). The mating faces 214, 216 are also shown in their mating alignment in a first configuration (FIG. 11) and a second configuration (FIG. 13) in which the first sprocket portion 210 is rotated 180° from the first configuration (FIG. 11). The first mating face 214 includes a first protrusion 132 and a first recess 142. Likewise, the second mating face 216 includes a second protrusion 134 and a second recess 144. Each protrusion 132, 134 includes an elevated surface 162, 164 (FIG. 10) that is elevated relative to the neutral plane 170 (FIG. 9) of the mating face 214, 216. Each recess 142, 144 includes a recessed surface 166, 168 that is recessed relative to the neutral plane 170 (FIG. 9) of the mating face 214, 216. Each recess 142, 144 is disposed across the mid-plane 180 (FIG. 9) and opposite from the protrusion 132, 134 (i.e., across the mid-plane 180 and the same distance from the center plane 190).

The first mating face 214 may also include a first landing 152 and the second mating face 216 may also include a second landing 154. In the illustrated embodiment, the first landing 152 is a third recess 146 and the second landing 154 is a fourth recess 148. The third and fourth recesses 146, 148 each have a depth less than a depth of the first and second recesses 142, 144. In other embodiments, the first landing 152 is a flat surface (not shown) of the first mating face 214 and the second landing 154 is a flat surface (not shown) of the second mating face 216 (i.e., the recesses 146, 148 are eliminated).

Figure 16:
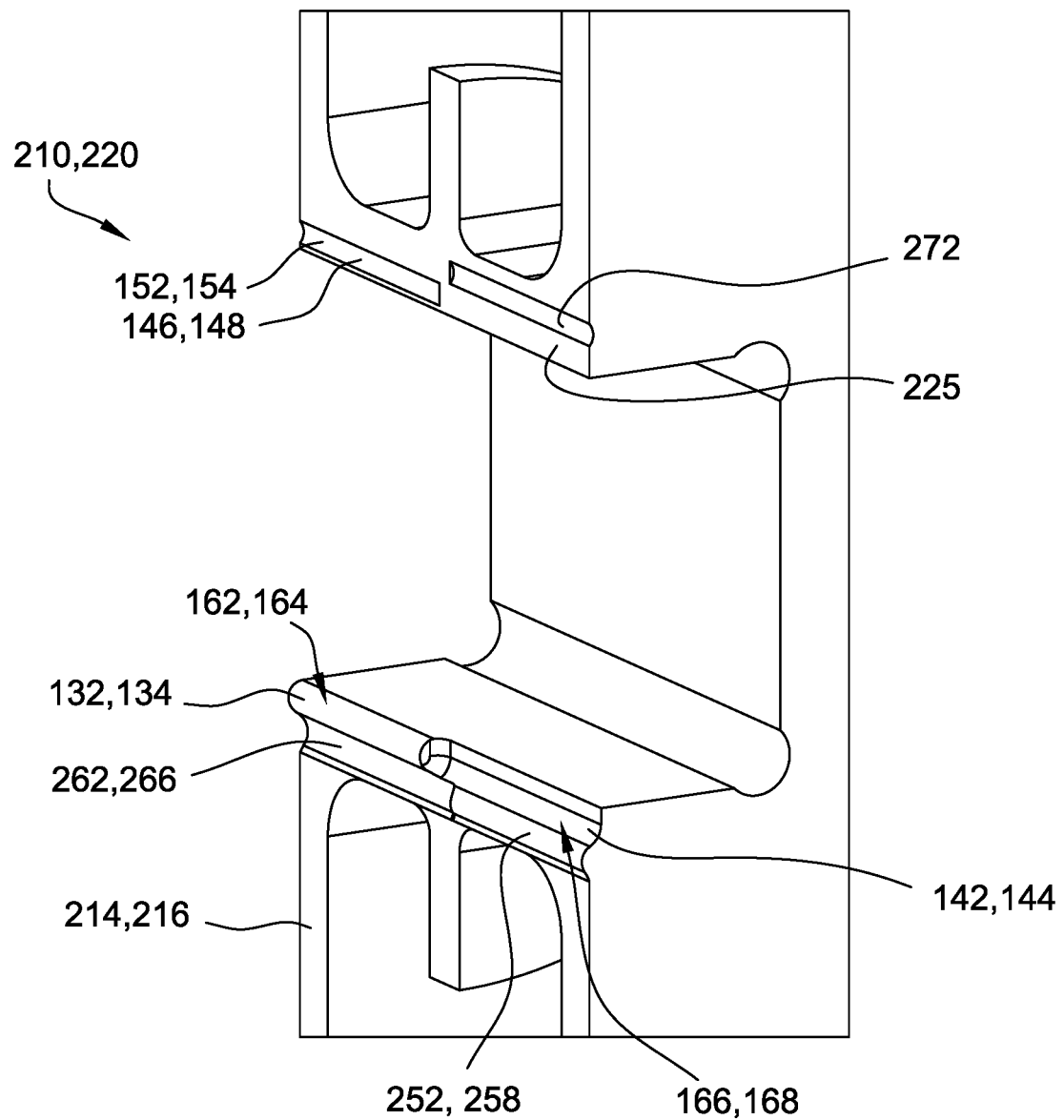
FIG. 16 is a detailed view of the mating face of yet another embodiment split sprocket portion.

The first mating face 214 and second mating face 216 may include additional projections 252, 258 and recesses 262, 266 that are opposite each other across the mid-plane 180 (FIG. 9). In some embodiments, these additional projections 252, 258 and recesses 262, 266 are eliminated (i.e., the split sprocket may have a single projection and a single recess on each mating face to function as described herein). Another embodiment of the split sprocket portion 210, 220 is shown in FIG. 16. The split sprocket portion 210, 22 includes a further recess 272 (e.g., to aid in alignment).

The split sprocket 20 may be assembled in a first configuration 410 (FIGS. 11-12C) in which the sprocket 20 is tightly secured to the shaft 16 in a fixed axial position along its length. In the first configuration 410, the first protrusion 132 of the first sprocket portion 210 is received in the second recess 144 of the second sprocket portion 220, and the second protrusion 134 of the second sprocket portion 220 is received in the first recess 142 of the first sprocket portion 210. In the first configuration 410, the first sprocket wheel segment 244 and the fourth sprocket wheel segment 256 mate to form a first sprocket wheel 270 and the second sprocket wheel segment 246 and the third sprocket wheel segment 254 mate to form a second sprocket wheel 280 (the wheels 270, 280 being shown in FIG. 5 but one of the sprocket portions 210, 220 is rotated 180° from the position in FIG. 5 in this first configuration).

By rotating one of the sprocket portions 210, 220 180° from the position shown in FIGS. 11-12c, the split sprocket 20 may be selectively assembled in a second configuration 420 (FIGS. 3-5 and 13-14C). In the second configuration 420, the sprocket 20 is loosely coupled to the shaft 16 and able to slide along its length. In the second configuration 420, the first protrusion 132 of the first sprocket portion 210 contacts the second landing 154 of the second sprocket portion 220 and the second protrusion 134 of the second sprocket portion 220 contacts the first landing 152 of the first sprocket portion 210. In the second configuration 420, the first sprocket wheel segment 244 and the third sprocket wheel segment 254 mate to form a first sprocket wheel 270 (FIG. 5), and the second sprocket wheel segment 246 and the fourth sprocket wheel segment 256 mate to form a second sprocket wheel 280.

In both configurations 410, 420, the first and second hub segments 340, 350 form a center hub 360 (FIG. 5) disposed between the first and second sprocket wheels 270, 280. The clamp 32 contacts the center hub 360 to secure the first sprocket portion 210 to the second sprocket portion 220.

When assembled in the first configuration 410 (FIGS. 11-12C), the first sprocket portion notch 310 and the second sprocket portion notch 320 form a first sprocket opening 370 (FIG. 12A) for receiving the shaft 16. The sprocket portions 210, 220 engage tightly with the shaft 16 to secure the sprocket 20 to the shaft 16 in a fixed axial position. The clearance $C_{410}$ (FIG. 12B) between the shaft 16 (i.e., along the sides 314, 316 of the shaft 16 that are parallel to the split between the first and second portions 210, 220) and the first and second sprocket portions 210, 220 is zero such that the first and second portions 210, 220 contact the shaft 16 at its sides 314, 316.

Figure 14C:
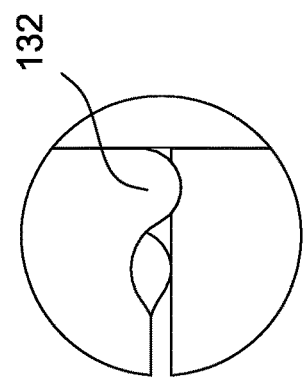
FIG. 14C is another detailed side view of the split sprocket in the second configuration.
Figure 14B:
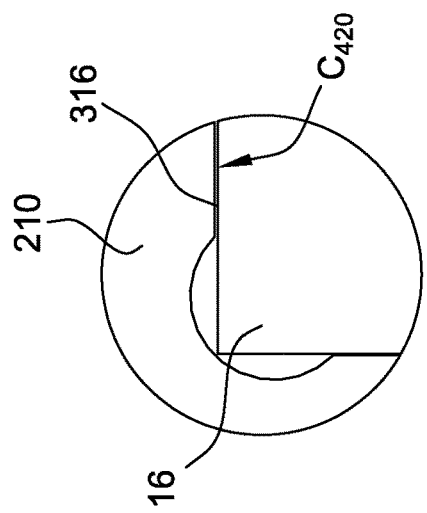
FIG. 14B is a detailed side view of the split sprocket in the second configuration.
Figure 14A:
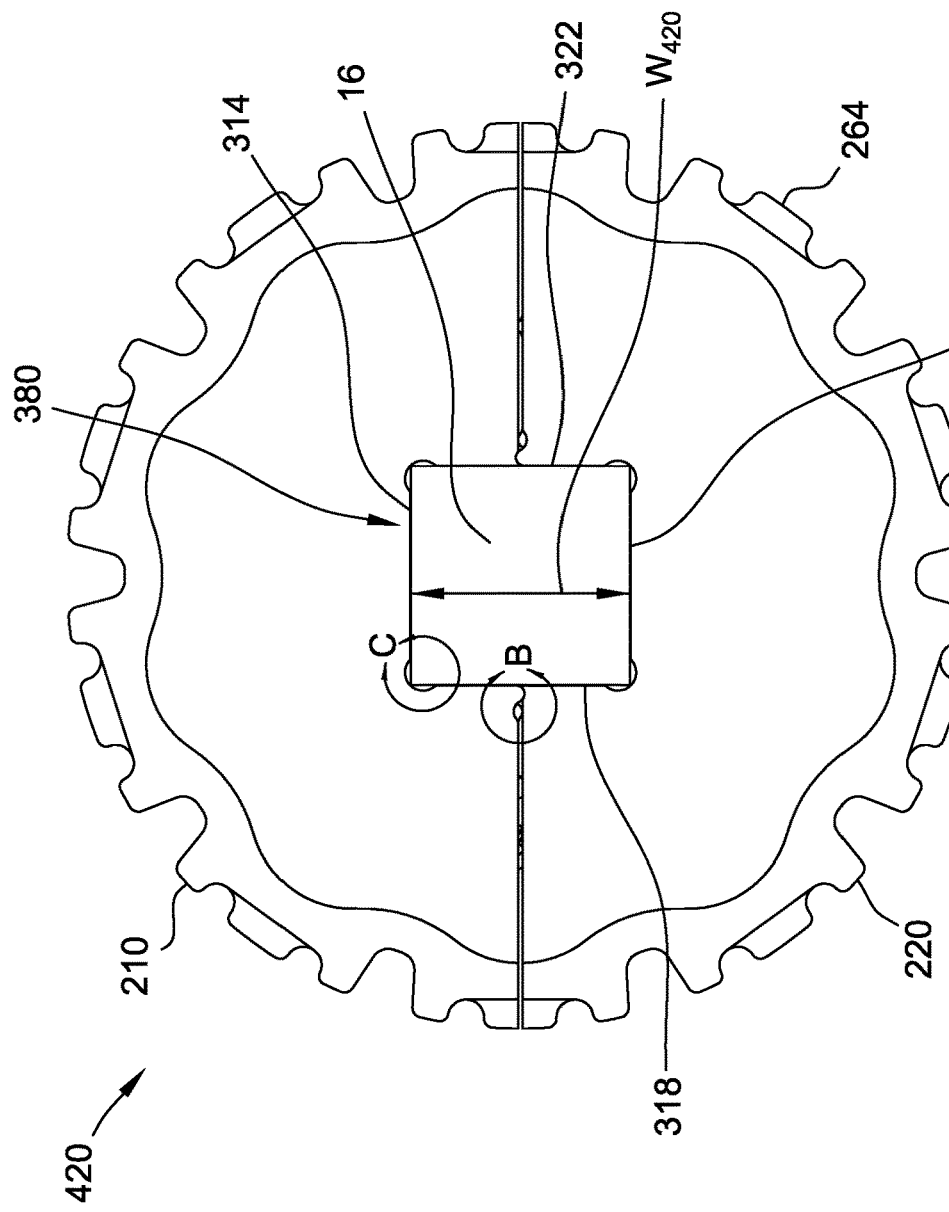
FIG. 14A is a side view of the split sprocket in the second configuration.

When assembled in the second configuration 420, the first sprocket portion notch 310 and the second sprocket portion notch 320 form a second sprocket opening 380 for receiving the shaft 16. As shown in FIG. 14B, the sprocket portions 210, 220 maintain a clearance fit $C_{420}$ with the shaft 16 to allow the sprocket 20 to slide along the length of the shaft (i.e., the first and second sprocket portions 210, 220 do not contact the shaft sides 314, 316). Accordingly, the width $W_{420}$ (FIG. 14A) of the second sprocket opening 380 exceeds the width $W_{410}$ of the first sprocket opening 370.

The first sprocket portion notch 310 and the second sprocket portion notch 320 are sized to provide clearance between the first and second sprocket portions 210, 220 and the sides 318, 322 of the shaft 16 that are perpendicular to the split between the first and second sprocket portions 210, 220. This clearance fit with the shaft sides 318, 322 allows the split sprocket 20 to float in the second configuration 420 (but be fixed in the first configuration 410 due to the contact fit between shaft sides 314, 316 and the first and second portions 210, 220).

The first sprocket opening 370 and second sprocket opening 380 may have the same shape as the cross-section of the shaft 16. For example, a square shaft 16 may be paired with embodiments having a square first sprocket opening 370 and second sprocket opening 380. If the cross-section of the shaft 16 is circular, a key 390 (not shown) may secure the split sprocket 20 to the shaft 16.

Figure 15:
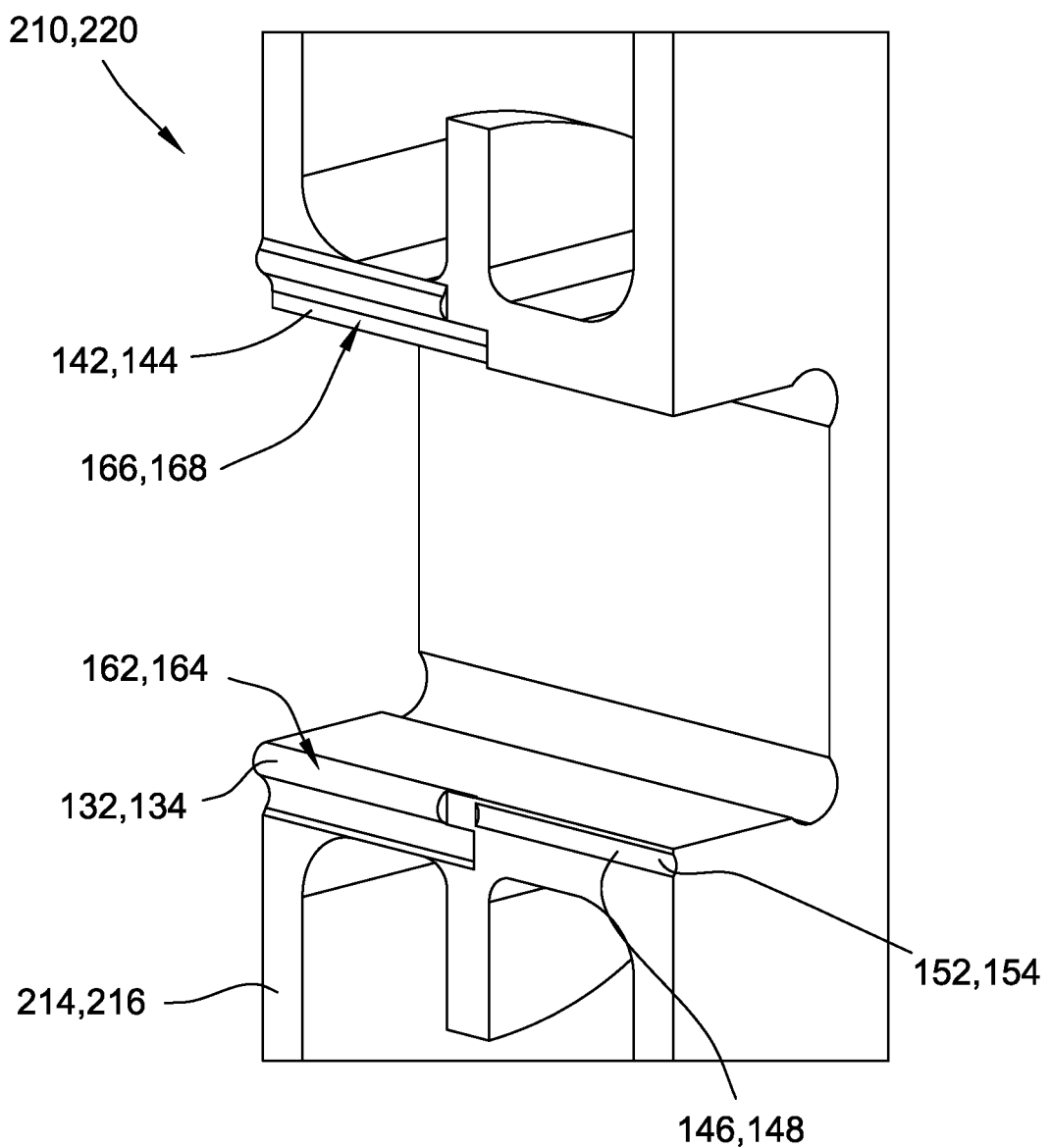
FIG. 15 is a detailed view of a mating face of another embodiment of the split sprocket portion.

Another embodiment of the split sprocket having a different arrangement of the protrusions 132, 134 and recesses 142, 144 on the first and second sprocket portions 210, 220 is shown in FIG. 15. As shown in FIG. 15, the recess 142, 144 are disposed across the center plane 190 (FIG. 9) (rather than the mid-plane 180 as in the embodiment illustrated in FIG. 10) and opposite from the protrusion 132, 134. Depending on whether the first and second sprocket portions 210, 220 are arranged in the first or second configuration, the projections 132, 134 may contact the recess 142, 144 or the landing 152, 154. The split sprocket of FIG. 15 may be otherwise identical to the split sprocket 20 described above.

It should be noted that the split sprockets described above are exemplary and the projection and recesses of the sprocket portions may generally be arranged in any manner and position in which the sprocket portions may be selectively positioned in a first configuration in which the sprocket is fixed to the shaft and a second configuration having a clearance fit to allow the sprocket to move axially along the shaft. The sprocket portions may have additional projections or recesses that allow the split sprocket to function as described herein. In some embodiments, the second set of projections 252, 258 and recesses 262, 266 may be eliminated.

Compared to conventional sprockets, the sprockets of the present disclosure have several advantages. The split design of the sprocket enables its easy removal from the shaft without any further machine disassembly, allowing parts to be quickly removed, sanitized, and reinstalled. Additionally, the design employs two identical sprocket portions to form a full sprocket wheel, providing flexibility in substituting parts in and out of service. The two identical portions can be assembled in two a first configuration in which the sprocket may float along the shaft to allow for thermal expansion of the belt and a second configuration in which the sprocket is axially fixed to the shaft to maintain belt alignment. The sprocket's fixed configuration allows it to bind tightly to the shaft without the use of additional clamps or collars that would need to slide off the end of the shaft for removal. Use of a split sprocket having two sprocket wheels allows a single clamp to secure the first and second sprocket portions together. Embodiments having a recessed landing promote alignment of the two sprocket portions and prevent binding in the floating configuration of the sprocket.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A split sprocket having a rotational axis and comprising:
   a first sprocket portion having first and second sides, and a mid-plane parallel to the first and second sides that extends through the first sprocket portion, the first sprocket portion comprising:
      a first sprocket wheel segment having teeth;
      a second sprocket wheel segment having teeth, the first sprocket wheel segment being across the mid-plane from the second sprocket wheel segment;
      a first circumferential outer surface for engaging a belt, the first circumferential outer surface having first and second ends and a center line midway between the first and second ends, the center line being parallel to the rotational axis, the first sprocket portion comprising a center plane perpendicular to the mid-plane and in which the rotational axis and center line are contained in the center plane; and
      a first mating face comprising:
         a first protrusion; and
            a first recess disposed (1) across the mid-plane and opposite from the first protrusion or (2) across the center plane and opposite the first protrusion; and
   a second sprocket portion having first and second sides, and a mid-plane parallel to the first and second sides that extends through the second sprocket portion, the second sprocket portion comprising:
      a third sprocket wheel segment having teeth;
      a fourth sprocket wheel segment having teeth, the third sprocket wheel segment being across the mid-plane from the fourth sprocket wheel segment;
      a second circumferential outer surface for engaging a belt, the second circumferential outer surface having first and second ends and a center line midway between the first and second ends, the center line being parallel to the rotational axis, the second sprocket portion comprising a center plane perpendicular to the mid-plane and in which the rotational axis and center line are contained in the center plane; and
a second mating face comprising:
a second protrusion; and
a second recess disposed (1) across the mid-plane and opposite from the second protrusion or (2) across the center plane and opposite the second protrusion.

2. A split sprocket as set forth in claim 1 wherein the first sprocket portion includes a first sprocket portion notch and the second sprocket portion includes a second sprocket portion notch, wherein, when assembled, the first sprocket portion notch and the second sprocket portion notch form a sprocket opening for receiving a shaft.

3. A split sprocket having a rotational axis and comprising:
a first sprocket portion having first and second sides, and a mid-plane parallel to the first and second sides that extends through the first sprocket portion, the first sprocket portion comprising:
a first circumferential outer surface for engaging a belt, the first circumferential outer surface having first and second ends and a center line midway between the first and second ends, the center line being parallel to the rotational axis, the first sprocket portion comprising a center plane perpendicular to the mid-plane and in which the rotational axis and center line are contained in the center plane; and
a first mating face comprising:
a first protrusion;
a first recess disposed (1) across the mid-plane and opposite from the first protrusion or (2) across the center plane and opposite the first protrusion; and
a first landing; and
a second sprocket portion having first and second sides, and a mid-plane parallel to the first and second sides that extends through the second sprocket portion, the second sprocket portion comprising:
a second circumferential outer surface for engaging a belt, the second circumferential outer surface having first and second ends and a center line midway between the first and second ends, the center line being parallel to the rotational axis, the second sprocket portion comprising a center plane perpendicular to the mid-plane and in which the rotational axis and center line are contained in the center plane; and
a second mating face comprising:
a second protrusion;
a second recess disposed (1) across the mid-plane and opposite from the second protrusion or (2) across the center plane and opposite the second protrusion; and
a second landing; and
wherein the split sprocket is configured to be assembled in (1) a first configuration in which the first protrusion is received in the second recess and the second protrusion is received in the first recess or (2) a second configuration in which the first protrusion contacts the second landing and the second protrusion contacts the first landing.

4. The split sprocket as set forth in claim 3 wherein the first landing is a third recess and the second landing is a fourth recess, the third and fourth recesses each having a depth less than a depth of each of the first and second recesses.

5. The split sprocket as set forth in claim 3 wherein the first landing is a flat surface of the first mating face and the second landing is a flat surface of the second mating face.

6. A split sprocket as set forth in claim 1 wherein the split sprocket is configured to be assembled in (1) a first configuration in which the first sprocket wheel segment and the fourth sprocket wheel segment mate to form a first sprocket wheel and the second sprocket wheel segment and the third sprocket wheel segment mate to form a second sprocket wheel or (2) a second configuration in which the first sprocket wheel segment and the third sprocket wheel segment mate to form a first sprocket wheel and the second sprocket wheel segment and the fourth sprocket wheel segment mate to form a second sprocket wheel.

7. A split sprocket as set forth in claim 1 wherein:
the first sprocket portion includes a first hub segment connected to the first sprocket wheel segment and the second sprocket wheel segment; and
the second sprocket portion includes a second hub segment connected to the third sprocket wheel segment and the fourth sprocket wheel segment, wherein, when assembled, the first and second hub segments form a center hub disposed between the first and second sprocket wheels.

8. The split sprocket as set forth in claim 7 comprising a clamp for securing the first sprocket portion to the second sprocket portion, wherein, when assembled, the clamp contacts the center hub.

9. A split sprocket as set forth in claim 1 wherein the first mating face defines a chord that extends between the first and second ends of the first circumferential outer surface and the second mating face defines a chord that extends between the first and second ends of the second circumferential outer surface.

10. A split sprocket having a rotational axis and comprising:
a first sprocket portion having first and second sides, and a mid-plane parallel to the first and second sides that extends through the first sprocket portion, the first sprocket portion comprising:
a first circumferential outer surface for engaging a belt, the first circumferential outer surface having first and second ends and a center line midway between the first and second ends, the center line being parallel to the rotational axis, the first sprocket portion comprising a center plane perpendicular to the mid-plane and in which the rotational axis and center line are contained in the center plane; and
a first mating face comprising:
a first protrusion; and
a first recess disposed across the mid-plane and opposite from the first protrusion; and
a second sprocket portion having first and second sides, and a mid-plane parallel to the first and second sides that extends through the second sprocket portion, the second sprocket portion comprising:
a second circumferential outer surface for engaging a belt, the second circumferential outer surface having first and second ends and a center line midway between the first and second ends, the center line being parallel to the rotational axis, the second sprocket portion comprising a center plane perpendicular to the mid-plane and in which the rotational axis and center line are contained in the center plane; and a second mating face comprising:
  a second protrusion; and
    a second recess disposed across the mid-plane and opposite from the second protrusion.

11. A split sprocket as set forth in claim 1 wherein the first recess is disposed across the center plane and opposite from the first protrusion and the second recess is disposed across the center plane and opposite from the second protrusion.

12. A split sprocket having a rotational axis and comprising:
  a first sprocket portion having first and second sides, and a mid-plane parallel to the first and second sides that extends through the first sprocket portion, the first sprocket portion comprising:
    a first circumferential outer surface for engaging a belt, the first circumferential outer surface having first and second ends and a center line midway between the first and second ends, the center line being parallel to the rotational axis, the first sprocket portion comprising a center plane perpendicular to the mid-plane and in which the rotational axis and center line are contained in the center plane; and
    a first mating face comprising:
      a first protrusion, the first protrusion having a first elevated surface that is elevated relative to a neutral plane of the first mating face; and
      a first recess disposed (1) across the mid-plane and opposite from the first protrusion or (2) across the center plane and opposite the first protrusion, the first recess having a first recessed surface that is recessed relative to the neutral plane, the neutral plane being parallel to the first mating face; and
  a second sprocket portion having first and second sides, and a mid-plane parallel to the first and second sides that extends through the second sprocket portion, the second sprocket portion comprising:
    a second circumferential outer surface for engaging a belt, the second circumferential outer surface having first and second ends and a center line midway between the first and second ends, the center line being parallel to the rotational axis, the second sprocket portion comprising a center plane perpendicular to the mid-plane and in which the rotational axis and center line are contained in the center plane; and
    a second mating face comprising:
      a second protrusion, the second protrusion having a first elevated surface that is elevated relative to a neutral plane of the second mating face; and
      a second recess disposed (1) across the mid-plane and opposite from the second protrusion or (2) across the center plane and opposite the second protrusion, the second recess having a second recessed surface that is recessed relative to the neutral plane, the neutral plane being parallel to the second mating face.

13. The split sprocket as set forth in claim 12 wherein:
the neutral plane of the first mating face is coincident with a major surface of the first mating face; and
the neutral plane of the second mating face is coincident with a major surface of the second mating face.

14. A split sprocket having a rotational axis and comprising:
  a first sprocket portion having first and second sides, and a mid-plane parallel to the first and second sides that extends through the first sprocket portion, the first sprocket portion comprising:
    a first circumferential outer surface for engaging a belt, the first circumferential outer surface having first and second ends and a center line midway between the first and second ends, the center line being parallel to the rotational axis, the first sprocket portion comprising a center plane perpendicular to the mid-plane and in which the rotational axis and center line are contained in the center plane; and
    a first mating face comprising:
      a first protrusion; and
        a first recess disposed (1) across the mid-plane and opposite from the first protrusion or (2) across the center plane and opposite the first protrusion; and
  a second sprocket portion having first and second sides, and a mid-plane parallel to the first and second sides that extends through the second sprocket portion, the second sprocket portion comprising:
    a second circumferential outer surface for engaging a belt, the second circumferential outer surface having first and second ends and a center line midway between the first and second ends, the center line being parallel to the rotational axis, the second sprocket portion comprising a center plane perpendicular to the mid-plane and in which the rotational axis and center line are contained in the center plane; and
    a second mating face comprising:
      a second protrusion; and
        a second recess disposed (1) across the mid-plane and opposite from the second protrusion or (2) across the center plane and opposite the second protrusion; and
  wherein each of the first and second circumferential outer surfaces includes teeth for engaging a belt and tabs perpendicular to the teeth to maintain alignment of the belt.

15. The split sprocket as set forth in claim 1 wherein the first sprocket portion is identical in shape to the second sprocket portion.

16. A conveyor system comprising:
  a conveyor belt that rotates about a drive assembly and a tail assembly, the drive assembly and the tail assembly both comprising a split sprocket as set forth in claim 1.

17. A split sprocket for engaging a belt comprising:
  a first sprocket portion comprising:
  a first circumferential outer surface having first and second ends;
    a first mating face that extends between the first and second ends of the first circumferential outer surface; and
  a first notch for receiving a shaft;
  a second sprocket portion comprising:
  a second circumferential outer surface having first and second ends;
    a second mating face that extends between the first and second ends of the second circumferential outer surface; and
  a second notch for receiving the shaft,
  wherein the split sprocket may be assembled in (1) a first configuration in which the first and second notches form a first sprocket opening for receiving the shaft and (2) a second configuration in which the first and second notches form a second sprocket opening for receiving the shaft, wherein a width of the second sprocket opening exceeds a width of the first sprocket opening.

18. The split sprocket as set forth in claim 17 wherein:
the first sprocket portion comprises a first sprocket wheel segment having teeth and a second sprocket wheel segment having teeth;
the second sprocket portion includes a third sprocket wheel segment having teeth and a fourth sprocket wheel segment having teeth; and
wherein, in the first configuration the first sprocket wheel segment and the fourth sprocket wheel segment mate to form a first sprocket wheel and the second sprocket wheel segment and the third sprocket wheel segment mate to form a second sprocket wheel and in the second configuration the first sprocket wheel segment and the third sprocket wheel segment mate to form a first sprocket wheel and the second sprocket wheel segment and the fourth sprocket wheel segment mate to form a second sprocket wheel.

19. The split sprocket as set forth in claim 18 wherein:
the first sprocket portion includes a first hub segment connected to the first sprocket wheel segment and the second sprocket wheel segment;
the second sprocket portion includes a second hub segment connected to the third sprocket wheel segment and the fourth sprocket wheel segment, wherein when assembled, the first and second hub segments form a center hub disposed between the first sprocket wheel and the second sprocket wheel; and
the split sprocket comprises a clamp for securing the first sprocket portion to the second sprocket portion, the clamp being the only clamp that secures the first sprocket portion to the second sprocket portion.

\* \* \* \* \*